April 7, 1970  M. CHRISTEN  3,505,117
FUEL CELL HAVING ELECTROLYTE CONCENTRATION INCREASING AND
DECREASING ELEMENTS
Filed Oct. 22, 1965
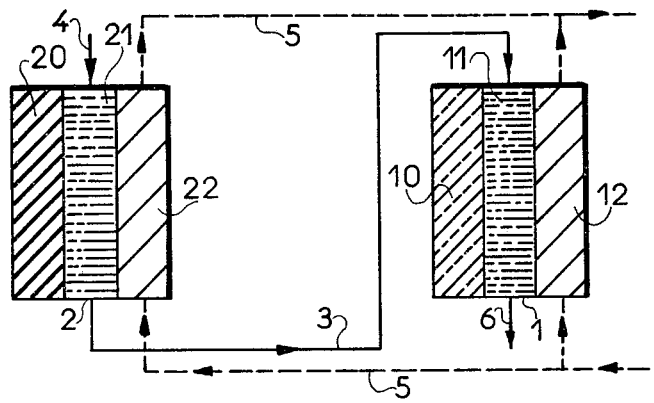
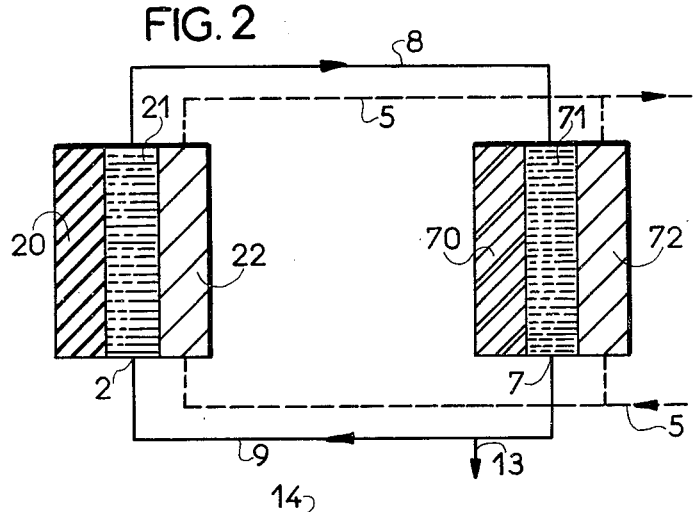
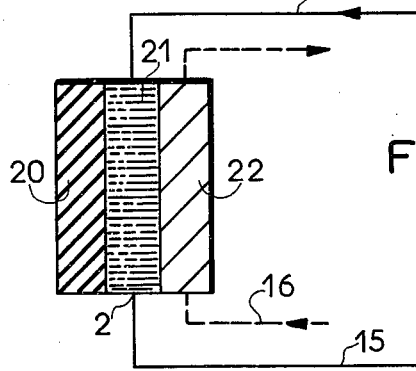
INVENTOR
MICHEL CHRISTEN
BY Paul M. Craig, Jr.
ATTORNEY 3,505,117
FUEL CELL HAVING ELECTROLYTE CONCENTRATION INCREASING AND DECREASING ELEMENTS
Michel Christen, Villemoisson-sur-Orge, France, assignor to Compagnie Generale d'Electricite, Paris, France
Filed Oct. 22, 1965, Ser. No. 501,511
Claims priority, application France, Dec. 2, 1964, 997,119
Int. Cl. H01m 27/00
U.S. Cl. 136—86      23 Claims

ABSTRACT OF THE DISCLOSURE

A current producing battery comprising at least two cells having a common electrolyte one of said cells increases the concentration of the electrolyte and the other decreases the concentration of the electrolyte during operation.

---

The invention relates generally to an electrochemical generator with electrically coupled generating elements and more particularly to an electrochemical power generator made up of an assembly of elements of the fuel cell type, especially those where the electrolyte undergoes changes during operation.

As is known, in certain types of fuel cells, the electrolyte concentration may vary, during operation, as a consequence of the three following phenomena:

(a) Electrolyte consumption or burn-up so as to avoid inertness in the fuel element causing a decrease in electrolyte concentration.

(b) Dilution of the electrolyte by the compound resulting from the reaction between the oxidizing element and the fuel element causing a decrease in electrolyte concentration, and (c) Increase of the electrolyte concentration as a result of electrolyte production during the reaction between the oxidizing element and the fuel element.

As merely illustrative examples, which should not be interpreted in a limiting sense, among cells of type (a) consuming electrolyte during operation, there are the cells of the aluminum/oxygen, zinc/oxygen, and borohydride/oxygen types. These cells operate with a very basic electrolyte, such as 5 N sodium hydroxide (soda) for instance, so as to avoid inertness of the fuel element. During operation of the aluminum/oxygen cell, for example, aluminum is first oxidized to give alumina, which would render the aluminum inert should it not be dissolved into aluminate, thereby consuming the alkaline electrolyte. Similarly, for the zinc/oxygen cell, a soluble zincate is produced and for a borohydride/oxygen cell, a borate is created.

As merely illustrative examples, which should not be interpreted in a limiting sense, among the cells of type (b) where the electrolyte is diluted during operation, there are the cells of the hydrogen/oxygen, hydrazine/oxygen and hydrocarbon/oxygen types. The hydrazine/oxygen cell makes use of an alkaline electrolyte such as sodium hydroxide (soda) or potassium hydroxide; hydrazine is usually fed directly into the electrolyte compartment where it decomposes at the cathode, releasing nitrogen and hydrogen. The latter combines with oxygen coming from the anode to produce water which results in a diluting of the electrolyte.

As a merely illustrative example, which should not be interpreted in a limiting sense, among the cells of the type (c) where the electrolyte concentration increases during operation, there are the cells of the sodium/oxygen type. The sodium/oxygen cell (sodium being provided, for example, as a mercury-sodium amalgam) makes use of a basic electrolyte, sodium hydroxide (soda) in particular. During operation, soda is produced and the electrolyte concentration thus increases.

The above-mentioned cells operate with optimum efficiency for a particular electrolyte concentration; the variations in electrolyte concentration during operation of the cell thus necessitate that the user either regenerate the electrolyte by increasing the concentration thereof or dilute it, which entails somewhat uneconomic operations. The invention makes it possible to overcome these difficulties by relatively simple and economic means.

It is a general object of the invention to provide an electrochemical generator which avoids the above-mentioned difficulties mainly through an association of at least two distinct cells of the fuel cell type making use of a common electrolyte, the two cells being of a complementary nature such that, when they operate separately, the electrolyte concentration in the first cell increases, while the electrolyte concentration in the second cell decreases. Means are additionally provided in said generator for connecting the electrolyte compartments of the two cells so that, during operation of said generator, the decrease of the electrolyte concentration in the second cell will be offset by transfer of electrolyte of increased concentration from the first cell.

According to one embodiment of the invention, when the decrease of the electrolyte concentration in the second cell results from its burn-up, the electrolyte concentration in the first cell is maintained approximately at its original level due to transfer of electrolyte to the second cell and to the addition of a diluent therein.

According to another embodiment of the invention, when the decrease of the electrolyte concentration in the second cell results from its dilution, the electrolyte concentration in the first cell is maintained aproximately at its original level by transfer of diluted electrolyte from the second cell.

According to one arrangement, the two cells may be integrated, i.e., they may have at least their electrolytic compartment in common. In the embodiment, and during operation, one of the cells increases the concentration of the common electrolyte and the other cell decreases the concentration of the common electrolyte.

Various embodiments of the invention will now be described by way of example, with reference to the accompanying drawings, in which:

FIGURE 1 is a schematic view of a generator made up of two cells, a first one in which the electrolyte concentration increases during operation while in the second one, it decreases due to burn-up.

FIGURE 2 is a schematic view of a generator made up of two cells, a first one in which the electrolyte concentration increases during operation while in the second one, it decreases due to dilution.

FIGURE 3 is a schematic view of a generator made up of two integrated cells.

In FIGURE 1, the generator comprises, on the one hand, a cell 1 consuming electrolyte during operation, for example, a cell of the aluminum-alkaline hydroxide, such as soda-oxygen type, the fuel (aluminum), electrolyte (soda) and oxidizer (oxygen) compartments being referred to respectively by the numerals 10, 11, 12. On the other hand, the generator includes a cell 2 making use of the same electrolyte as cell 1, but with an electrolyte concentration which increases during operation, such as a cell of the following type: alkaline compound—corresponding hydroxide-oxygen, for example the sodium or sodium amalgam-soda-oxygen cell, the numerals 20, 21, 22 referring respectively to the fuel (sodium or sodium amalgam), electrolyte (soda) and oxidizer (oxygen) compartments.

According to the invention, the electrolyte compartment 11 and 21 of the two cells are connected by means of a pipe 3 provided with appropriate means, not shown, for allowing the flow of electrolyte from compartment 21 to compartment 11. A pipe 4 is connected to said compartment 21 so as to permit addition of a diluent such as water. The oxygen supply and exhaust circuit for compartments 12 and 22, in dotted line, is shown as 5; the pipe 6 is connected to compartment 11 and enables the drainage of the aluminate-containing electrolyte. This electrolyte after use may either be discarded or sent to a regeneration plant. The fuel supply circuits for compartments 10 and 20 are not shown in this figure.

In such a generator, the fall of the soda concentration in the aluminum-soda-oxygen cell due to aluminate build-up is compensated by feeding to this cell soda from the sodium-soda-oxygen cell, the soda concentration in the latter being itself maintained approximately at its original level as a result of said feed flow and by adding a diluent such as water. The same process obviously applies also in the case of zinc-soda-oxygen and borohydride-soda-oxygen cells.

In FIGURE 2, the numerals 2, 20, 21, 22 denote similar parts as illustrated in FIGURE 1. The generator is made up of the cell 2, and of a cell 7 making use of a common electrolyte wherein the concentration falls because of dilution during operation, such as a cell of the hydrogen-soda-oxygen type, the hydrogen, soda and oxygen compartments being denoted respectively by the numerals 70, 71 and 72.

According to the invention, the electrolyte compartments 21 and 71 are connected by means of the pipes 8 and 9, which are provided with appropriate means (not shown) enabling electrolyte flow from compartment 21 to compartment 71 and from compartment 71 to compartment 21.

Thus the electrolyte flows in a closed loop, a branch 13 making it possible to collect the excess electrolyte as it builds up. The oxygen supply and exhaust circuit for compartments 22 and 72 is shown as 5, while the fuel supply circuits for compartments 20 and 70 are not shown in this figure.

In such a generator, the fall of the soda concentration in the hydrogen-soda-oxygen cell, due to water build-up is compensated for by feeding to this cell soda from the sodium-soda-oxygen cell, the soda concentration in the latter itself being maintained approximately at its original level as a result of a feed flow of diluted soda from the hydrogen-soda-oxygen cell. The same process obviously applies to the cells of the hydrazine-soda-oxygen type as well as to those of the hydrocarbon-soda-oxygen type.

A generator of this type, where the electrolyte is used in "closed circuit" between two elements of the fuel cell type enables beneficially to dispense with said electrolyte regeneration operations and is thus particularly convenient for plants where space is limited.

FIGURE 3 shows a generator with integrated elements. The numerals 2, 20, 21 and 22 denote elements similar to those illustrated in FIGURES 1 and 2 above. The generator results from the coupling of a cell 2 with a cell making use of the same electrolyte and where the electrolyte concentration decreases during operation such as a cell of the following type: fuel (for example, borohydride)-soda-oxygen. The electrolytic and oxygen compartments of this cell are respectively the same as compartments 21 and 22. The fuel, for instance borohydride, is fed into the electrolytic compartment 21 of the cell 2 by means of a pipe 14. A pipe 15 makes it possible to collect the excess soda produced as well as the reaction products.

The oxygen supply and heating circuit for compartment 22 is shown in 16, while the fuel supply circuit of compartment 20 is not shown in this figure.

In the electrolytic compartment of such a generator, there is a direct compensation of the soda concentration decrease in the borohydride-soda-oxygen cell by the supply of soda from the sodium-soda-oxygen cell.

It is evident that various modifications and changes may be made in the embodiments of the invention herein described and shown without departing from the spirit and scope of the invention as described in the following claims.

I claim:

1. A fuel cell battery provided with electrically coupled current generating elements for the generation of electrical energy, comprising at least two associated current producing elements, said elements utilizing a common electrolyte, said two elements being of such composition that under the conditions of separate operation the electrolyte concentration in the first element increases while that in the second element decreases, means provided for connecting the electrolytic compartments of the two elements for feeding the electrolyte of one element to the other element so that during operation of said fuel cell battery the electrolyte concentration decrease in the second element is compensated by electrolyte supply from the first element.

2. A fuel cell battery according to claim 1 wherein the first element is made up of a fuel cell of the alkali-metal-corresponding hydroxide-oxygen type, and the second element is made up of a fuel cell of aluminum-alkaline metal hydroxide-oxygen.

3. A fuel cell battery according to claim 1 wherein the first element is made up of a fuel cell in the form of a sodium-sodium hydroxide-oxygen cell, and the second element is made up of a fuel cell of zinc-alkaline metal hydroxide-oxygen.

4. A fuel cell battery according to claim 1 wherein the first element is made up of a fuel cell of the alkali-metal-corresponding hydroxide-oxygen type, and the second element is made up of a fuel cell of borohydride-alkaline metal hydroxide-oxygen.

5. A fuel cell battery provided with electrically coupled current generating elements for the generating of electrical energy comprising first and second current producing elements which are integrated by having at least their electrolytic compartment in common, said elements utilizing a common electrolyte and being of such composition that during operation the first element increases the concentration of said common electrolyte and the second element decreases the concentration of said common electrolyte.

6. A fuel cell battery having electrically coupled current generating elements comprising first and second fuel cells each having a fuel electrode, a combustion-supporting electrode and a compartment defined by said electrodes containing an electrolyte, and means interconnecting said first and second fuel cells for passing said electrolyte from the electrolyte compartment of said first fuel cell to the electrolyte compartment of said second fuel cell, at least two corresponding electrodes of said first and second fuel cells being of dissimilar composition in a manner such that during operation the electrolyte concentration of the first fuel cell increases while that of the second fuel cell decreases.

7. A fuel cell battery according to claim 6 wherein said first fuel cell and said second fuel cell are electrically interconnected.

8. A fuel cell battery according to claim 6 wherein said first fuel cell is of alkali metal-corresponding hydroxide-oxygen.

9. A fuel cell battery according to claim 8 wherein said first fuel cell is a sodium amalgam-sodium hydroxide-oxygen cell.

10. A fuel cell battery according to claim 8 wherein said second fuel cell is of aluminum-alkaline metal hydroxide-oxygen.

11. A fuel cell battery according to claim 8 wherein said second fuel cell is of zinc-alkaline metal hydroxide-oxygen.

12. A fuel cell battery according to claim 8 wherein said second fuel cell is of borohydride-alkaline metal hydroxide-oxygen.

13. A fuel cell battery according to claim 8 wherein said second fuel cell is of hydrogen-alkaline metal hydroxide-oxygen.

14. A fuel cell battery according to claim 8 wherein said second fuel cell is of hydrazine-alkaline metal hydroxide-oxygen.

15. A fuel cell battery according to claim 8 wherein said second fuel cell is of hydrocarbon-alkaline metal hydroxide-oxygen.

16. A fuel cell battery having electrically coupled current generating elements comprising first and second fuel cells, each having a fuel electrode, a combustion-supporting electrode and an integrated electrolytic compartment which is common to both of said fuel cells, said electrolytic compartment containing an electrolyte and at least two corresponding electrodes of said first and second fuel cells being of dissimilar composition in a manner such that during operation, the first fuel cell increases the concentration of the electrolyte and the second fuel cell decreases the concentration of the electrolyte.

17. A fuel cell battery according to claim 16 further including means for supplying a diluent to the electrolyte compartment of said first fuel cell.

18. A fuel cell battery having electrically coupled current generating elements comprising first and second fuel cells operating with the same electrolyte and said fuel cells being of such composition as to cause complementary increase or decrease of electrolyte concentrations during operation, and means interconnecting said first and second fuel cells for passing the electrolyte of said first fuel cell to said second fuel cell.

19. A fuel cell battery according to claim 18 wherein said first fuel cell is of the alkali metal-corresponding hydroxide-oxygen type.

20. In a method for the generation of electrical energy utilizing a fuel cell battery having electrically coupled first and second fuel cells operating with the same electrolyte wherein the composition of cells is such that the electrolyte concentration in the first fuel cell increases during operation while the electrolyte concentration in the second fuel cell decreases during operation, the improvement which comprises feeding the electrolyte of the first fuel cell to the second fuel cell so that during the operation of the fuel cell battery the electrolyte concentration decrease in the second fuel cell is compensated by the electrolyte supply from the first fuel cell.

21. The method of claim 20, wherein when the decrease of the electrolyte concentration in the second fuel cell results from its use the electrolyte concentration in the first fuel cell is maintained at about its original level by transferring the electrolyte to the second fuel cell and by supplying a diluent to the electrolyte of the first fuel cell.

22. The method of claim 20, wherein when the decrease of the electrolyte concentration in the second fuel cell is due to dilution during operation, the electrolyte concentrations in the first and second fuel cells are maintained at about their original levels by transferring the electrolyte of high concentration from the first fuel cell to the second fuel cell and by transferring the electrolyte of low concentration from the second fuel cell to the first fuel cell.

23. In a method for the generation of electrical energy utilizing a fuel cell battery having electrically coupled first and second fuel cells, the improvement which comprises using an integrated electrolyte compartment which is common to both of said fuel cells, said fuel cells being so composed and said electrolyte compartment containing an electrolyte such that during operation the first fuel cell increases the concentration of the electrolyte and the second fuel cell decreases the concentration of the electrolyte.

References Cited

UNITED STATES PATENTS

| | | |
|---|---|---|
| 2,635,431 | 4/1953 | Bichowsky. |
| 2,921,110 | 1/1960 | Crowley et al. |
| 3,161,546 | 12/1964 | Yeager et al. |
| 3,294,587 | 12/1966 | Le Duc. |
| 3,300,341 | 1/1967 | Gregory et al. |

JOHN H. MACK, Primary Examiner

H. FEELEY, Assistant Examiner

U.S. Cl. X.R.

136—6, 83, 159